G. BOCCARDO.
APPARATUS FOR MEASURING THE VELOCITY AND DIRECTION OF THE MARINE UNDERCURRENTS.
APPLICATION FILED NOV. 28, 1910.
1,022,385.
Patented Apr. 2, 1912.
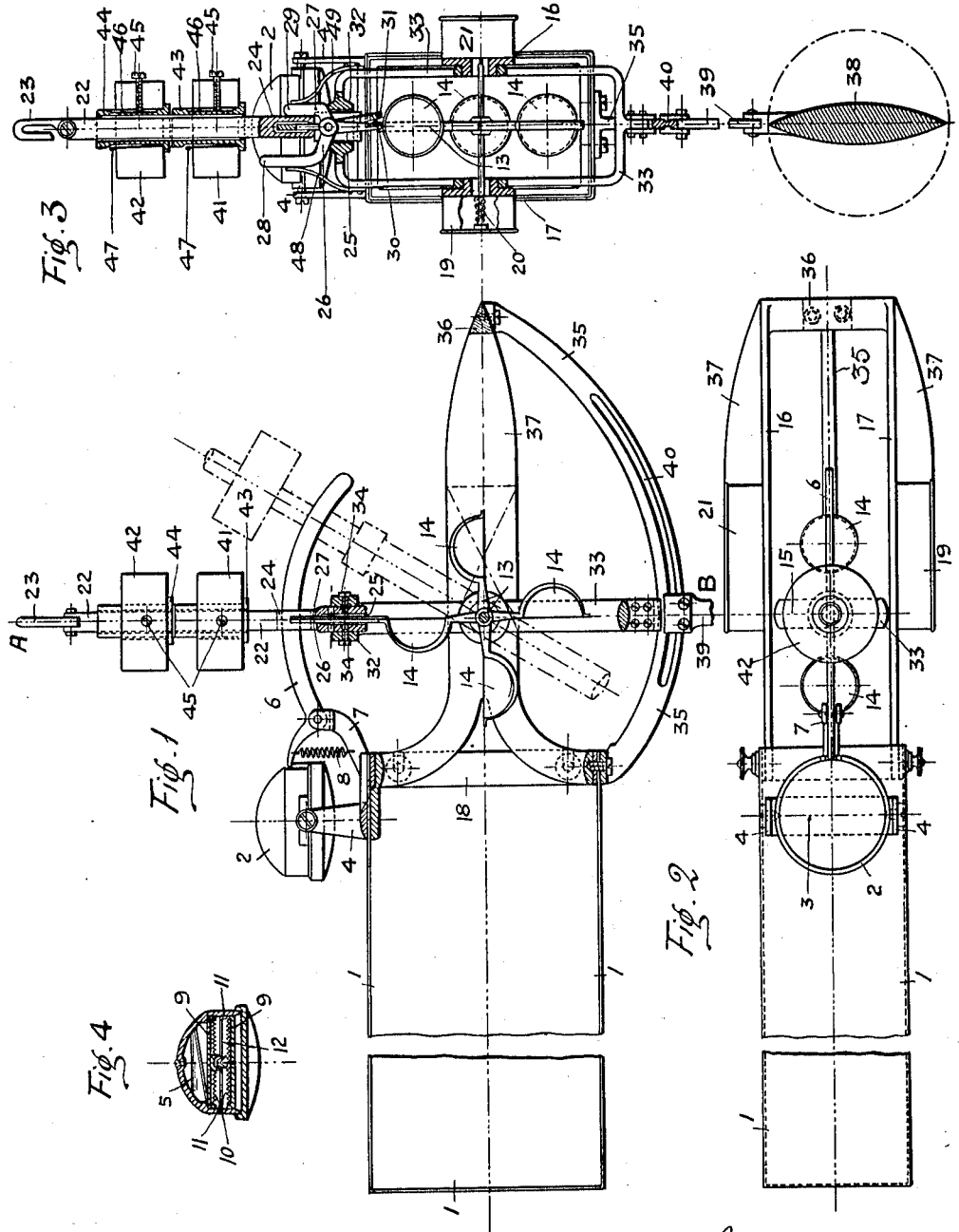

UNITED STATES PATENT OFFICE.

GIOVANNI BOCCARDO, OF GENOA, ITALY.

APPARATUS FOR MEASURING THE VELOCITY AND DIRECTION OF THE MARINE UNDERCURRENTS.

1,022,385.  Specification of Letters Patent.  Patented Apr. 2, 1912.

Application filed November 28, 1910. Serial No. 594,605.

*To all whom it may concern:*

Be it known that I, GIOVANNI BOCCARDO, naval engineer, a subject of the King of Italy, residing at Genoa, Italy, have invented a new and useful Apparatus for Measuring the Velocity and Direction of the Marine Undercurrents, of which the following is a specification.

My present invention relates to an apparatus which indicates the direction of flow of marine undercurrents and the velocity thereof.

The objects of my invention are to provide an apparatus adapted to be sunk from a ship to the desired depth whereupon the current acts upon a rudder like structure provided with a suitable compass, the needle of which may be set to show the position of the rudder with respect to directions indicated upon the compass after the rudder has been acted upon by the current.

Another object of my invention is to further combine means for determining the velocity of the current flow, which includes a revoluble element positioned by the rudder to be directly in the path of the current and is adapted to be set in motion and rendered operative during a set period by which the recorded number of the revolutions of the revoluble element may enable a person to determine the relation of motion to time.

I attain these objects by the construction and arrangement of parts shown in the accompanying drawings, in which:—

Figure 1 is a central vertical partial section taken longitudinally of the apparatus embodied in my invention. Fig. 2 is a plan view of the apparatus. Fig. 3 is a part sectional view on the line A—B of Fig. 1. Fig. 4 is a central vertical section through a compass used in connection with the apparatus.

Similar characters refer to similar parts throughout the views.

In the drawings: 33 represents a rectangular frame structure provided with a collar 32 at its upper end which is adapted to receive the end of a rod 22 held in connection therewith, by means of set screws 34. The rod 22 is provided with a hook 23 by which the frame structure may be suspended by a cable, not shown in the drawings, from the ship. If desired, the cable may be carried by a drum, not shown in the drawings, from which the depth to which the device is sunk may be determined by the number of revolutions of the drum in playing out or drawing in the cable. Pivoted laterally to the frame structure 33 and carried thereby are cross members 16 and 17, connected at one side of the axis of the pivot points by a tie member 36. The cross members 16 and 17, at their ends opposite the tie member 36, are adapted to support a suitable box like rudder 1, open at the ends, and on the top of which is supported a compass 2 pivoted to a suitable frame 4 with the axis of rotation indicated at 3. The function of this compass and details of construction will be subsequently described.

In order to retain the rudder with its longitudinal axis in substantially a horizontal plane, regardless of the plane of its supporting frame 33, cross members 16 and 17 are provided with weights 37 to counter-balance the rudder, a curved arm 35, extending from the tie member 36 to a brace structure 18 of the rudder, being provided with a bob 38 carried by an arm 39 which is adjustably secured to the arm 35 and movable in grooves 40 formed in the latter. By this construction, the structure pivoted to frame 33, may be accurately adjusted to bring the longitudinal axis of the box-shaped rudder 1 in a horizontal plane and allowing the current to flow therethrough without interruption, thus enabling the rudder to assume a position with its surfaces parallel with the direction of current flow.

With reference to Fig. 4, showing the compass 2 in vertical central section, a needle 12 is pivoted between plates 9, the peripheries of which are provided with teeth extending at right-angles to the plane of the plates and extending toward the ends of the needle. When the plates 9 are substantially in horizontal planes, the needle 12 has free movement therebetween, and may assume a position to which it is attracted, however, when the compass is tilted upon its axis 3, the plates 9 are brought out of horizontal planes and the needle 12 endeavoring to assume a horizontal position is engaged, at its end, by the teeth 11 of the plates 9 and held in a fixed position.

From the foregoing description it will be seen that, after the rudder 1 has assumed a position according to the current flow, the needle of the compass may be retained in the position it was attracted to when free to move by tilting the compass and the direction of current flow determined when the structure is drawn out of the water.

The compass 2 is further provided with means whereby it may be held in a horizontal position parallel with the axis of the rudder and automatically tilted from such position when desired. Such means comprise an arm 7 carried by the rudder 1, to which is pivoted an arm 6 passing freely through a slot 24 in the rod 22. That portion of the rod passing through the slot is curved with its arc of curvature concentric with the pivot point of the rudder structure so that it will not be affected by movement between the frame structure 33 and the rudder structure. The other end of the arm 6 engages the compass, to retain the same in the horizontal position before mentioned, the arm being normally retained in such a position for retention by a spring 8. The compass 2 is so weighted, such as by mercury 5, as to bring the center of gravity of the same out of the vertical line of suspension of the compass, when in the horizontal position, so that, when the arm 6 is actuated, the compass rotates, bringing the needle into engagement with the teeth 11.

The velocity of the current is ascertained through the following coacting parts:—Pivoted to the frame 33, and with its axis as indicated at 15, is a wheel 13 provided with cup-shaped members 14 arranged to be actuated by the current, one following another in the well known manner. It will readily be seen that the rudder 1 carries the frame structure 33 to such a position that the wheel 13 is positioned with its plane of rotation parallel to the direction of the current flow, passing through the open ends of the rudder. A suitable tachometer, of any well-known type, indicated at 19 is actuated by the threaded end 20 of the axle of the wheel 13, and registers the number of revolutions of the wheel during a set period. In order to counter-balance the tachometer a weight 21 is carried by the frame at the opposite side thereof. For the purpose of controlling the wheel 13, the rod 22 is slotted as at 25 and has pivoted therein two bell-crank levers 26 and 27. The end 30 of the lever 26 is normally positioned, by the spring 48, to engage the periphery of the wheel 13 to hold the same from rotating. The end 31 of the lever 27 is normally held out of engagement with the periphery of the wheel 13 by a spring 49, but may be actuated to engage the wheel and prevent rotation thereof. The means for actuating the levers 26 and 27 and the arm 6, at the desired time, comprises the following: Ring weights 41 and 42, provided with bushes 43 and 44 respectively, are adapted to slide along the cable and rod 22 supporting the apparatus and engage the ends 28 and 29 of the levers 26 and 27, and the arm 6. The bushes 43 and 44 have limited axial sliding movement with respect to the ring weights by means of the screws 45 and slot 46, but are normally held in the position as shown in the drawings, by a leaf-spring 47.

The operation of the device is as follows:—The apparatus is lowered to the desired depth, the compass and rudder axis being in horizontal positions and the wheel 13 being prevented from rotating by the lever 26. The weight 41 is then allowed to slide along the cable from the ship until it comes in contact with the end 28 of the lever 26. The impact actuates the lever and frees the wheel 13 which is caused to rotate by the current. The second weight 42 is not lowered until a set period of time after the weight 41 has been effective. When lowered the bush 44 of the weight 42 contacts with the bush 43 and the impact forces the latter to move with respect to the weight 41, bush 43 contacting with the end 29 of the lever 27 and also with the arm 6, resulting in the engagement of the lever end 31 with the wheel 13, preventing its movement, and the tilting of the compass to fix the needle as hereinbefore described. When the apparatus is brought to the surface the rate of current flow may be determined by the tachometer in connection with the length of time the same is active, and the direction of flow, by the position of the compass needle with respect to the axis of the rudder.

I claim:—

1. An apparatus of the character described comprising in combination, a suitable frame, a movable element carried by said frame, adapted to normally assume a definite position relative to the direction of current flow, and means for registering the position of the magnetic meridian with relation to said movable element when acted upon by the current.

2. An apparatus of the character described comprising in combination, a suitable frame, a movable element carried by said frame, adapted to normally assume a definite position relative to the direction of current flow, a device carried by said movable element provided with means for normally indicating the position of the magnetic-meridian, and means for retaining the said indicator in a set position with respect to said movable member for registering the relative position of the latter with the magnetic meridian at a certain period of operation.

3. An apparatus of the character described comprising in combination, a suitable frame adapted for suspension by a cable or the like, a revoluble element carried by said frame and adapted to be actuated by the current flow, a tachometer operable upon movement of said wheel, mechanism for normally holding said wheel in a set position, means for disengaging said mechanism from said wheel for rendering said wheel and tachometer operable, and other means for engaging said wheel for retaining the same in a set position to discontinue operation of said tachometer, whereby the velocity of the current flow may be determined by the aid of said tachometer.

4. An apparatus of the character described comprising in combination, a suitable frame adapted for suspension by a cable or the like, a revoluble element carried by said frame and adapted to be actuated by the current flow, mechanism for automatically positioning said wheel in operative relation to the direction of current flow for actuation thereby, a tachometer operable upon movement of said wheel, mechanism for normally holding said wheel in a set position, means for disengaging said second mentioned mechanism from said wheel for rendering the wheel and tachometer operable, and other means for engaging said wheel for retaining the same in a set position to discontinue operation of said tachometer whereby the velocity of current flow may be determined by the aid of said tachometer.

5. An apparatus of the character described comprising in combination, a suitable frame adapted for suspension by a cable, or the like, a revoluble element carried by said frame and adapted to be actuated by the current flow, a tachometer operable upon movement of said wheel, a pivoted member adapted to normally engage said wheel to prevent rotation thereof, a weight adapted to actuate said pivoted member for disengagement thereof from said wheel, a second pivoted member normally out of engagement with said wheel, and a second weight for actuating said second mentioned pivoted member to render said wheel inactive after having been freed by said first mentioned weight.

6. An apparatus of the character described comprising in combination, a suitable frame adapted for suspension by a cable or the like, a revoluble element carried by said frame and adapted to be actuated by the current flow, mechanism for automatically positioning said wheel in operative relation to the direction of current flow for actuation thereby, a tachometer operable upon movement of said wheel, a pivoted member adapted to normally engage said wheel to prevent rotation thereof, a weight adapted to acutate said pivoted member for disengagement thereof from said wheel, a second pivoted member normally out of engagement with said wheel, and a second weight for actuating said second mentioned pivoted member to render said wheel inactive after having been freed by said first mentioned wheel.

7. An apparatus of the character described comprising in combination, a suitable frame adapted for suspension by a cable or the like, a rudder structure pivotally connected to said frame and adapted to automatically assume a definite position with respect to the current flow, means for maintaining said rudder in a substantially horizontal position, a compass provided with a needle, adapted to normally lie parallel with the horizontal axis of said rudder structure, and means for engaging the needle of said compass when the compass is thrown out of a horizontal position to retain the same in a set position with respect to said rudder for registering the relative position of the latter with respect to the magnetic-meridian.

8. An apparatus of the character described comprising in combination, a suitable frame adapted for suspension by a cable or the like, a rudder structure pivotally connected to said frame, and adapted to automatically assume a definite position with respect to the current flow, means for maintaining said rudder in a substantially horizontal position, a compass provided with a needle and pivotally carried by said rudder and adapted to normally assume a position with the face thereof out of a horizontal plane, mechanism normally retaining said compass with its face in a substantially horizontal plane, projections arranged circumferentially about said compass in engaging proximity to said needle when said compass is in a normal position, and means for disengaging said mechanism for permitting movement of said compass to a normal position, whereupon the said needle is engaged by said projections for retaining the same in a set position.

9. An apparatus of the character described comprising in combination, a suitable frame adapted for suspension by a cable or the like, a revoluble element carried by said frame and adapted to be actuated by the current flow, a rudder carried by said frame for automatically positioning said revoluble element in operative relation to the direction of current flow for actuation thereby, a tachometer operable upon movement of said wheel, a pivoted member adapted to normally engage said wheel to prevent rotation thereof, a weight adapted to actuate said pivoted member for disengagement thereof from said wheel, a second pivoted member normally out of engagement with said wheel, and a second weight for actuating said second mentioned pivoted member for engagement thereof with said wheel, whereby the same is rendered inactive.

10. An apparatus of the character described, comprising in combination, a suitable frame adapted for suspension by a cable or the like, a revoluble element carried by said frame and adapted to be actuated by the current flow, a rudder carried by said frame for automatically positioning said revoluble element in relation to the direction of current flow for actuation thereby, a tachometer operable upon the movement of said wheel, mechanism for normally holding said wheel in a set position, means for disengaging said mechanism from said wheel for rendering the wheel tachometer operable, and other means for engaging said wheel for retaining the same in a set position to discontinue operation of said tachometer whereby the velocity of current flow may be determined by the aid of said tachometer.

11. An apparatus of the character described comprising in combination, a suitable frame adapted for suspension by a cable or the like, a rudder structure pivotally connected to said frame and adapted to assume automatically a definite position with respect to the current flow, means for maintaining said rudder in a substantially horizontal position, a compass provided with a needle pivotally carried by said rudder and adapted to normally assume a position with the face thereof out of the horizontal, a lever for normally retaining said compass with its face in a substantial horizontal plane, projections arranged circumferentially about said compass in engaging proximity to said needle when said compass is thrown out of a horizontal position, a revoluble element carried by said frame and adapted to be actuated by the current flow, a tachometer operable upon movement of said wheel, a pivoted member adapted to normally engage said wheel to prevent rotation thereof, a weight adapted to actuate said pivoted member for disengagement thereof from said wheel, a second pivoted member normally out of engagement with said wheel, and a second weight for actuating said second mentioned pivoted member for engagement thereof with said wheel and engagement with said lever for permitting movement of said compass to a normal position whereby the said wheel is rendered inactive, and the direction of current flow indicated by the said compass needle.

In testimony whereof I have signed my name in this specification in the presence of two witnesses.

GIOVANNI BOCCARDO.

Witnesses:
 PIO RINALDINI,
 ANGELO BORAGINO.

---

Copies of this patent may be obtained for five cents each, by addressing the "Commissioner of Patents, Washington, D. C."